(12) United States Patent
Bernasconi et al.

(10) Patent No.: US 7,369,719 B2
(45) Date of Patent: May 6, 2008

(54) INTEGRATED TUNABLE WAVELENGTH CONVERTER AND VARIABLE OPTICAL DELAY

(75) Inventors: Pietro Bernasconi, Aberdeen, NJ (US); David Neilson, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 125 days.

(21) Appl. No.: 11/307,905

(22) Filed: Feb. 27, 2006

(65) Prior Publication Data

US 2007/0201789 A1    Aug. 30, 2007

(51) Int. Cl.
  *G02B 6/12* (2006.01)
(52) U.S. Cl. .......................................... 385/14
(58) Field of Classification Search ............... None
  See application file for complete search history.

(56) References Cited

U.S. PATENT DOCUMENTS 6,768,827 B2 *   7/2004   Yoo ................ 385/14
2001/0053008 A1 * 12/2001 Ueno ............... 359/158

* cited by examiner

*Primary Examiner*—Sung Pak
*Assistant Examiner*—Hoang Tran

(57) ABSTRACT

A monolithically integrated tunable wavelength converter and variable optical delay device(s) that is capable of providing optical delay(s) of any length. Advantageously, our devices are both compact and readily realized as a photonic integrated circuit (PIC) on a semiconductor substrate.

10 Claims, 6 Drawing Sheets

INTEGRATED TUNABLE WAVELENGTH CONVERTER AND VARIABLE OPTICAL DELAY

FIELD OF THE INVENTION

This invention relates generally to the field of optical communications, and in particular to a monolithically integrated tunable wavelength converter and variable optical delay devices.

BACKGROUND OF THE INVENTION

Optical delay devices are essential elements for all-optical implementation(s) of a wide variety of other optical devices including interferometers, signal delay devices, signal synchronization devices, and optical buffering devices. And while very short optical delays may be readily implemented by providing small changes in an optical path length or small changes to an optical signal propagation speed, longer delays are provided by fiber delays having a large path differences. Such delays typically require from few meters to several kilometers of optical fiber that are difficult to maintain and impossible to integrate into a compact form. Consequently, a compact, variable optical delay device capable of providing both long and short optical delays would represent a significant advance in the art.

SUMMARY OF THE INVENTION

We have developed, in accordance with the principles of the invention, a monolithically integrated tunable wavelength converter and variable optical delay device(s) that is capable of providing optical delay(s) of any length. Advantageously, our devices are both compact and readily realized as a photonic integrated circuit (PIC) for example, on a semiconductor substrate.

BRIEF DESCRIPTION OF THE DRAWING

A more complete understanding of the present invention may be realized by reference to the accompanying drawing in which:

FIG. 2b is a schematic block diagram of an alternative embodiment of the integrated optical buffer having a Wavelength Division Multiplexed (WDM) re-circulating loop of FIG. 2a;

FIG. 2c is a schematic block diagram of another alternative embodiment of the integrated optical buffer having a Wavelength Division Multiplexed (WDM) re-circulating loop of FIG. 2a;

DETAILED DESCRIPTION

Figure 1:
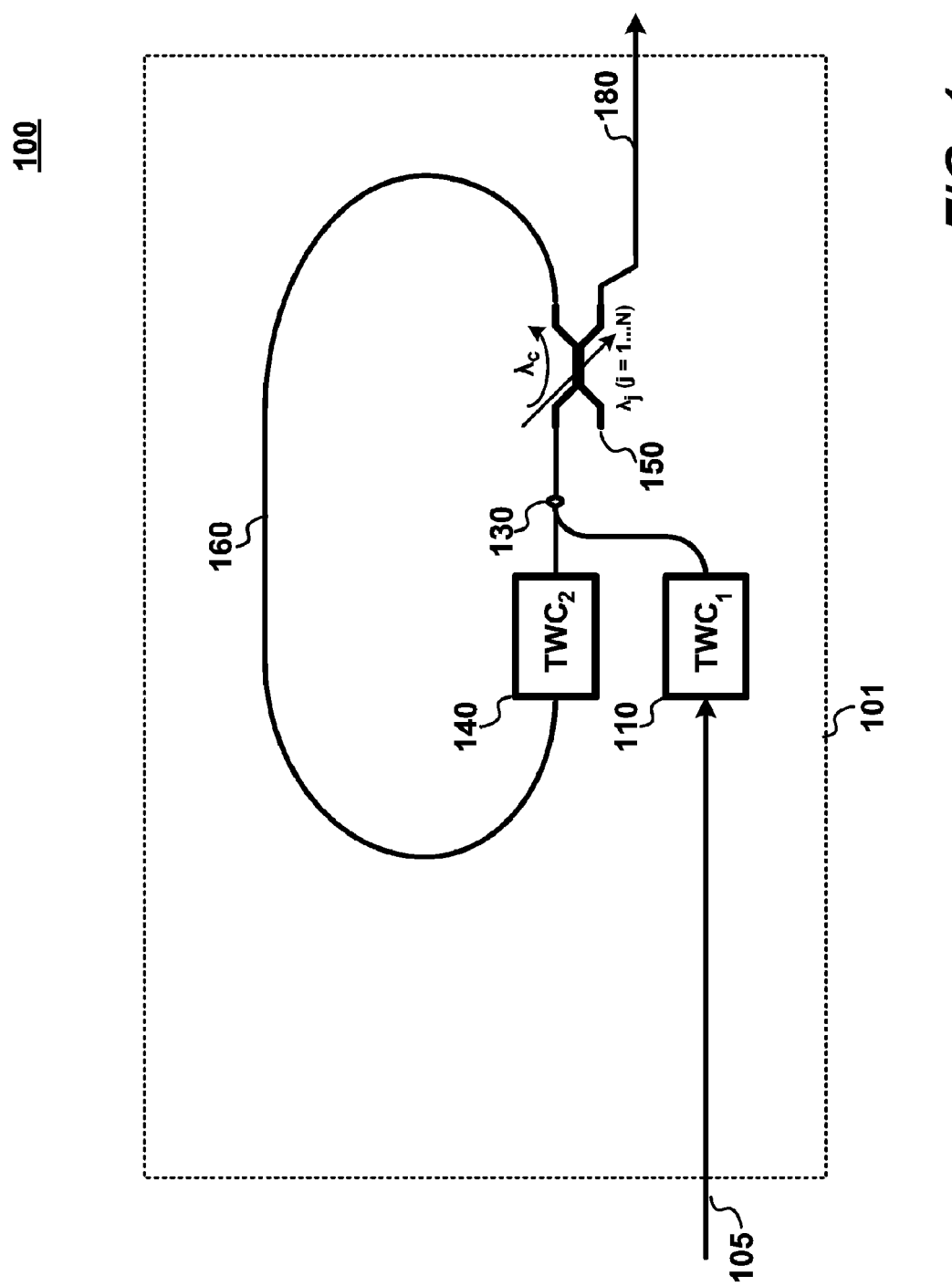
FIG. 1 is a schematic block diagram of a re-circulating optical delay loop according to the present invention.

FIG. 1 shows a schematic block diagram of a re-circulating delay loop constructed according to the present invention. With reference to that FIG. 1, there it shows a re-circulating device 100 having a first tunable wavelength converter 110, a second tunable wavelength converter 140, a power combiner 130, and a frequency coupler 150. As is generally known, a frequency coupler such as that shown is a multi-port device in which the connectivity between input and output ports depends upon the frequency of the transiting optical signal; typical examples are directional couplers, band filters, interleaving filters. According to our inventive principles, the recirculating device 100 may be monolithically integrated on a single chip 101 exhibiting sufficient gain properties, i.e., Indium Phosphide (InP) or Gallium Arsenide (GaAs).

Accordingly, when incoming signal 105 is received by first tunable wavelength converter 110. If the wavelength of the signal 105 is converted to $\lambda_c$ (c≠1 ... N) the signal will pass through the power combiner 130 and at the frequency coupler 150 it will be directed into the loop 160. Alternatively, if the wavelength converter 110 translate the wavelength of the input signal 105 to $\lambda_j$ (j=1 ... N), the signal after the power combiner 130 will be forwarded to the output 180 by the frequency coupler 150.

Once the signal is in the loop 160 it will be eventually received by second tunable wavelength converter 140, where it may be sent around delay loop 160 by maintaining its wavelength of $\lambda_c$ or sent as output by converting its wavelength to $\lambda_j$ (j=1 ... N)

As depicted in FIG. 1, our inventive device exhibits a number of useful properties. First, it acts as an optical buffer as well as a tunable wavelength converter. Second, its "storage time" of an optical signal is nominally infinite due to its signal regeneration properties occurring during the wavelength conversion process inside 140. Finally, it has an instantaneous output capacity that advantageously may be twice as large as its input. This is achieved, for example, when an input signal 105 is forwarded directly to the output 180 by converting its wavelength to $\lambda_j$ (j=1 ... N) while another one—previously stored in the loop—is released by the second tunable wavelength converter 140 on a different wavelength $\lambda_k$ (k=1 ... N, k≠j). Accordingly, the storage capacity of this "buffer" is fixed, and limited by the length of the loop 160.

Figure 2A:
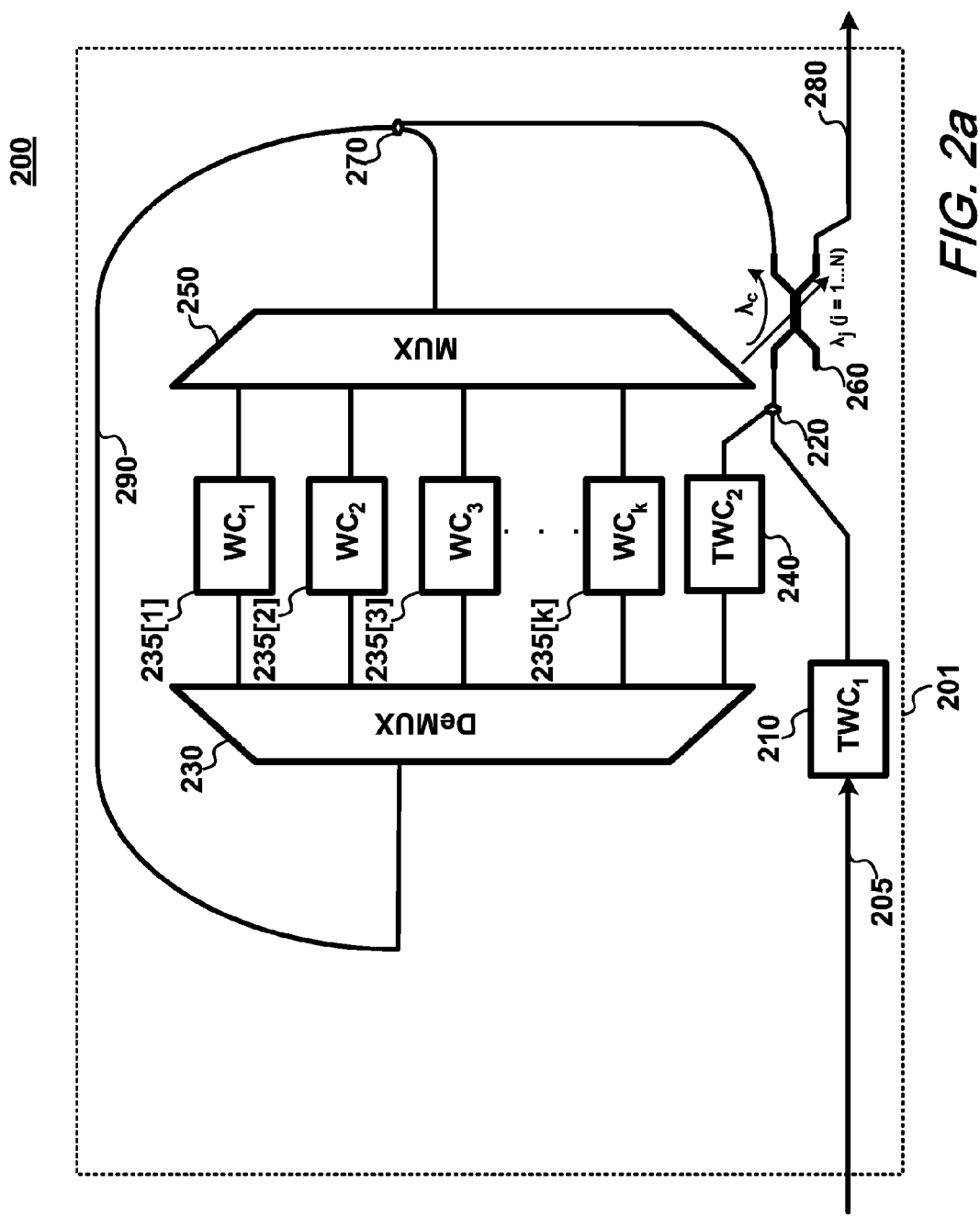
FIG. 2a is a schematic block diagram of an integrated optical buffer having a Wavelength Division Multiplexed (WDM) re-circulating loop according to the present invention.

Such "restrictions" are overcome by modifying our single-channel loop into a Wavelength-Division-Multiplexing (WDM) loop as shown in FIG. 2a. Turning to that FIG. 2a, it can be seen that a plurality of fixed wavelength converters 235[1] ... 236[k] are inserted in the loop 260 optically connected to, and interposed between a multiplexer 250, and demultiplexer 230 pair. As is known by those skilled in the art, fixed wavelength converters are devices whose output wavelength is unique and unchangeable as opposed to tunable wavelength converters 210 and 240. Advantageously, and as before, the device 200 may be monolithically integrated onto a single chip 201.

Optical multiplexing, and demultiplexing have been accomplished in the past by using an interconnection apparatus having one or more input waveguides communicating with the input of a star coupler. The output of the star coupler communicates with an optical grating comprising a series of optical waveguides, each of the waveguides differing in length with respect to its nearest neighbor by a predetermined amount. The grating is connected to the input of a second star coupler. The second star coupler has one or more output waveguides which form the outputs of the multiplexing, and demultiplexing apparatus. An example of such an interconnection apparatus is disclosed in U.S. Pat. Nos. 5,002,350 and 5,136,671, the entire contents and teachings of which are incorporated herein by reference.

The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths is directed to a predetermined one of the input ports of the apparatus. Each of the input wavelengths is separated from the others and directed to a predetermined one of the output ports of the apparatus. An appropriate selection of input wavelength also permits switching between any selected input port to any selected output port. Accordingly, these devices are oftentimes referred to as frequency routing devices.

Returning now to our discussion of FIG. 2a, the plurality of wavelength converters $235[1] \ldots 235[k]$ are configured such that a signal leaving a particular wavelength converter, WC[i] (where $1 \leq i \leq k$) will be multiplexed through the effect of multiplexer 250 and appear at the next successive wavelength converter WC[i+1] after it traverses the loop 260 and is presented as an input into demultiplexer 230.

Consequently and similarly to the previous case, an input signal 205 presented into a first tunable wavelength converter 210 it is either inserted into the loop 290—through the power combiner 220, the frequency coupler 260, and a second power combiner 270—by converting its wavelength to $\lambda_c$ ($\lambda_c \neq \lambda_j$ j=1 . . . N) or is forwarded to the output via the frequency coupler 260 by converting its wavelength to $\lambda_j$ (j=1 . . . N).

The converted wavelength $\lambda_c$ signal is received by the demultiplexer 230 where, according to its input wavelength, is routed to a particular one of the wavelength converters $235[1] \ldots 235[k]$, or a second tunable wavelength converter 240 where it may be directed through the effect of the frequency coupler 260 such that it is sent around delay loop 290 by maintaining its wavelength of $\lambda_c$ or sent as output 280 by converting its wavelength to $\lambda_j$.

With each successive trip through the loop 290, a signal may proceed successively through the wavelength converters $235[m] \ldots 235[k]$ (m<=k) until it is presented to the second tunable wavelength converter 240 where, as we have noted earlier, may be redirected into the loop 290 by maintaining its wavelength $\lambda_c$ or sent as output to second power combiner 280 by converting its wavelength to $\lambda_j$.

As can be readily appreciated by those skilled in the art, the total buffering capacity of this configuration shown in FIG. 2a is increased by a factor of k over that shown in the configuration shown in FIG. 1. Viewed alternatively, if the capacity is kept fixed, then the shortest possible delay is reduced to 1/k. Consequently, our inventive configuration may advantageously provide delays of a fraction of the signal length, thereby enabling a degree of signal alignment and/or synchronization.

As implemented, those skilled in the art will now quickly recognize several advantageous aspects of our inventive configuration(s). First, the multiplexer 250 and demultiplexer 230 may be constructed from well-characterized arrayed waveguide gratings (AWG). Second, the frequency coupler 260 may be implemented as Fourier filter, directional coupler, or alternatively, Arrayed Waveguide Grating(s), etc. Additionally, the delay loop(s) 290 may be implemented as passive waveguides with/without in-line amplification. Finally, the components may all be integrated onto a single, active InP substrate (or GaAs) in a very compact form.

Advantageously, our inventive, variable-delay configuration(s) may be co-integrated with other optical functions that share the same material substrate. Additionally, no long, bulky fiber delay lines are necessary as with prior-art implementations. The delay is provided—with our inventive structures—by a relatively short optical waveguide which is effectively and nominally infinitely long via our inventive re-circulation.

Still further, by using multiple wavelengths in the loop, our inventive structures further multiply the effective delay by the number of wavelengths. Significantly, the optical waveguide may be shared among signals carried at different wavelengths.

As those skilled in the art will now readily appreciate, our inventive configuration(s) may be used a compact, tunable delay line(s) to provide packet synchronization and/or alignment in an all optical manner without any need for costly, optical-to-electrical-to-optical conversion(s). Of course, such device(s) may be used as an all-optical buffer or memory for example, in optical packet switches or routers.

Figure 2B:
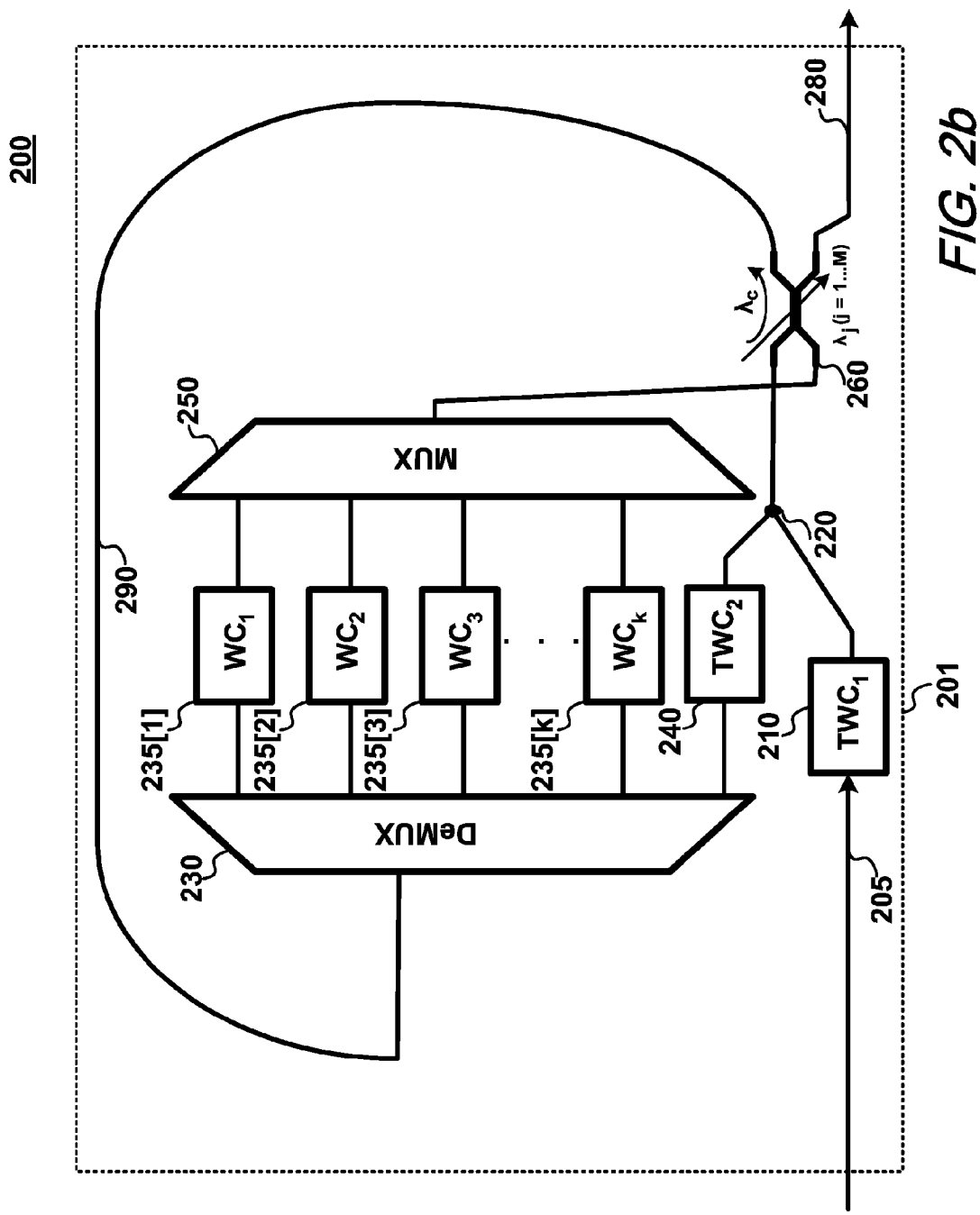

In the arrangement of FIG. 2a the loss introduced by the power combiner 270 can be avoided by modifying the design as shown in FIG. 2b. The loop is closed by connecting the output of the multiplexer 250 to a second port of the frequency coupler 260. To provide the same functionality as in the previous case, the frequency coupler 260 must allow at least M wavelengths $\lambda_j$ (j=1 . . . M)—being M the largest number between N and k+1—to traverse the coupler in the cross-state (for example from top input to bottom output and from bottom input to top output) and support at least k+1 wavelengths $\lambda_c$ ($\lambda_c \neq \lambda_j$ j=1 . . . M) that can traverse the coupler in the bar-state (from top input to top output and from bottom input to bottom output). In addition, the wavelengths $\lambda_c$ when launched into the demultiplexer 230 must also allow the access to each wavelength converter 235[1 . . . k] and to 240, as well. This is possible by taking advantage of the periodic response in the wavelength domain of the demultiplexer when for example it is implemented as AWG. It is known that wavelengths separated by integer multiples of the grating's free spectral range will emerge at the same output port when launched from the same input.

As an illustrative example let us consider the case for N=5 and k=3. The demultiplexer 230 will than need at least k+1=4 ports—to accommodate k $WC_k$ 235[1 . . . 3] and $TWC_2$ 240—so that its free spectral range (FSR) will be of 4 channels at least. Without restriction of the generality, let the FSR be 4 channels. This means that if $WC_k$ can be accessed by $\lambda_k$ (k=1 . . . 3) so will by $\lambda_k$+n FSR (n being an integer). Being the FSR 4 channels, in our example each output port of 230 will be accessible through $\lambda_k$, $\lambda_{k+4}$, $\lambda_{k+8}$ and so on. If the frequency coupler 260 consists for example of a band filter where $\lambda_j$ (j<6) is assigned to the cross-state while $\lambda_j$ (j>6) is assigned to the bar-state, the first tunable wavelength converter 210 can be tuned to $\lambda_j$, (j=1 . . . 5) if the input signal 205 is destined to the output 280 or to $\lambda_j$, (j=9 . . . 12) to send the signal into the loop 290 and to a specific WC or $TWC_2$. The same wavelength assignment applies to $TWC_2$. Other wavelength schemes may be found depending upon the characteristics of the frequency coupler 260.

Figure 2C:
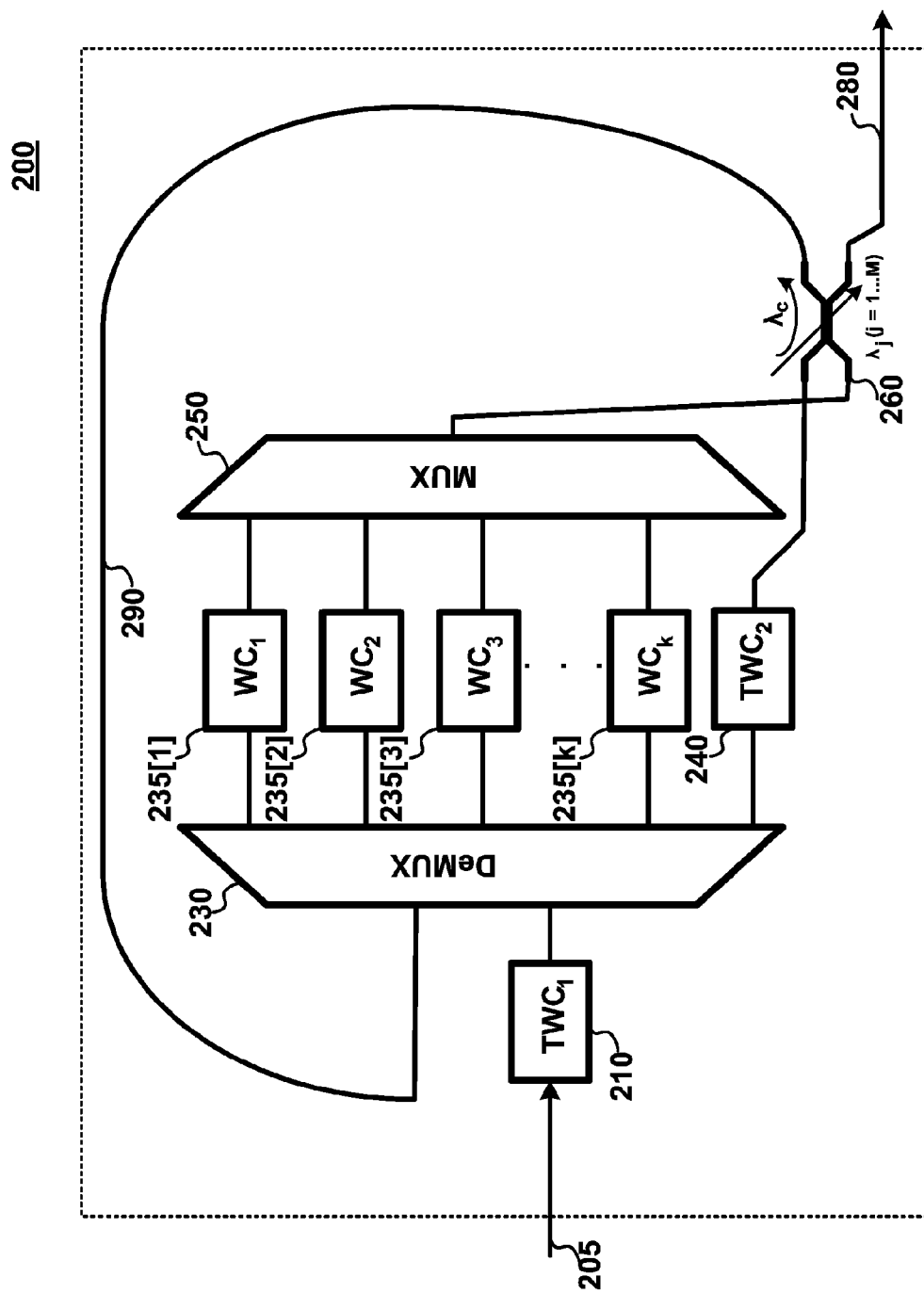

FIG. 2c shows another variation of the original design in which the power combiner 220 and the power losses associated to it are removed by connecting the first tunable wavelength converter 210 to the demux 230. The input signal 205 is received by 210 and converted to the wavelength that will direct the signal to the desired WC 235 or to the second TWC$_2$ 240. While the wavelength management and the functionality is the same as that described previously, this arrangement does not allow multiple signals to be released simultaneously from the loop unless the TWC$_2$ 240 can convert multiple signals at once.

Figure 3A:
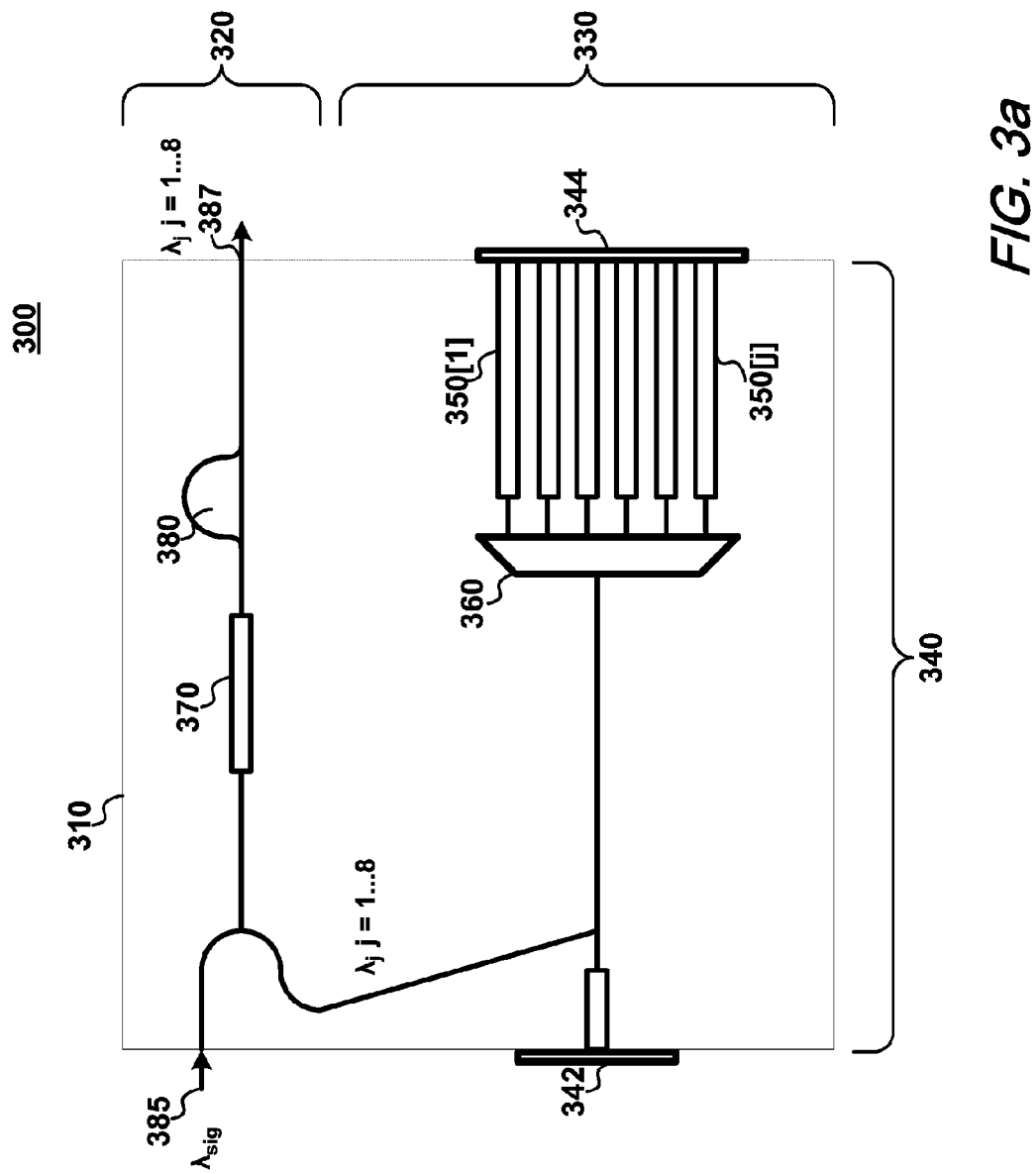
FIG. 3a is a schematic block diagram of an integrated wavelength converter according to the present invention.

Turning now to FIG. 3a, there is shown a tunable wavelength converter 300, such as that shown earlier in both FIG. 1 and FIG. 2. More specifically, the wavelength converter 300 which is preferably monolithically integrated onto a single chip 310 comprises a multifrequency laser (MFL) component 330 and a wavelength converter (WC) component 320 which are optically interconnected.

The MFL 330 may advantageously be a multi-cavity oscillator that includes an array of Semiconductor Optical Amplifier (SOA) gain sections 350[1] . . . 350[j] and an arrayed waveguide grating (AWG) as wavelength dispersion element, positioned within an optical laser cavity 340 the ends of which are defined by a pair of highly-reflective elements 342, 344. As implemented, the grating may be double-chirped both in length and in angle, thereby providing single-mode operation with high side-mode suppression ratios (SMSR).

The wavelength is selected by driving current into one of the SOAs (350[1] . . . 350[j]) in the array. Consequently, such "digital" tuning makes our inventive MFL quite attractive for fast switching applications as it may be tuned in less than one nanosecond. In an exemplary embodiment, and while not shown in FIG. 3a, the MFL may conveniently provide eight channels. Providing additional channels is accomplished by fabricating additional SOAs on the integrated chip, 310 or by adding an additional AWG and a second array of SOAs.

Similarly, the wavelength converter 320 includes a SOA 370 as a nonlinear element followed by an asymmetric Mach-Zehnder Interferometer filter 380. Such an arrangement may be conveniently viewed as an optical gate.

In particular, when a pulsed signal $\lambda_{sig}$ 385 is applied and enters the SOA 370, a Continuous Wavelength (CW) signal $\lambda_j$ emitted by the MFL 330 undergoes both amplitude and phase modulation. If the MZI 380 is set to permit $\lambda_j$ interfere destructively at the output when no $\lambda_{sig}$ is present (closed gate), a modulated $\lambda_{sig}$ will disturb the balanced MZI 380 thereby "opening the gate" for a period substantially equal to the time delay introduced as a result of the unequal arms of the MZI 380.

Such operation allows a pulse to be released from the MZI 380 at the converted wavelength $\lambda_j$. In an exemplary device, the delay introduced in the MZI 380 is approximately 10 ps—a value very close to a pulse length of 33% RZ signals modulated at 40 Gbit/s and that provides a free spectral range FSR of 100 GHz. Consequently, our inventive structures require no frequency tuning of the filter when the MFL 330 switches among channels spaced by 100 GHz, although a fine phase balancing may still be required.

Figure 3B:
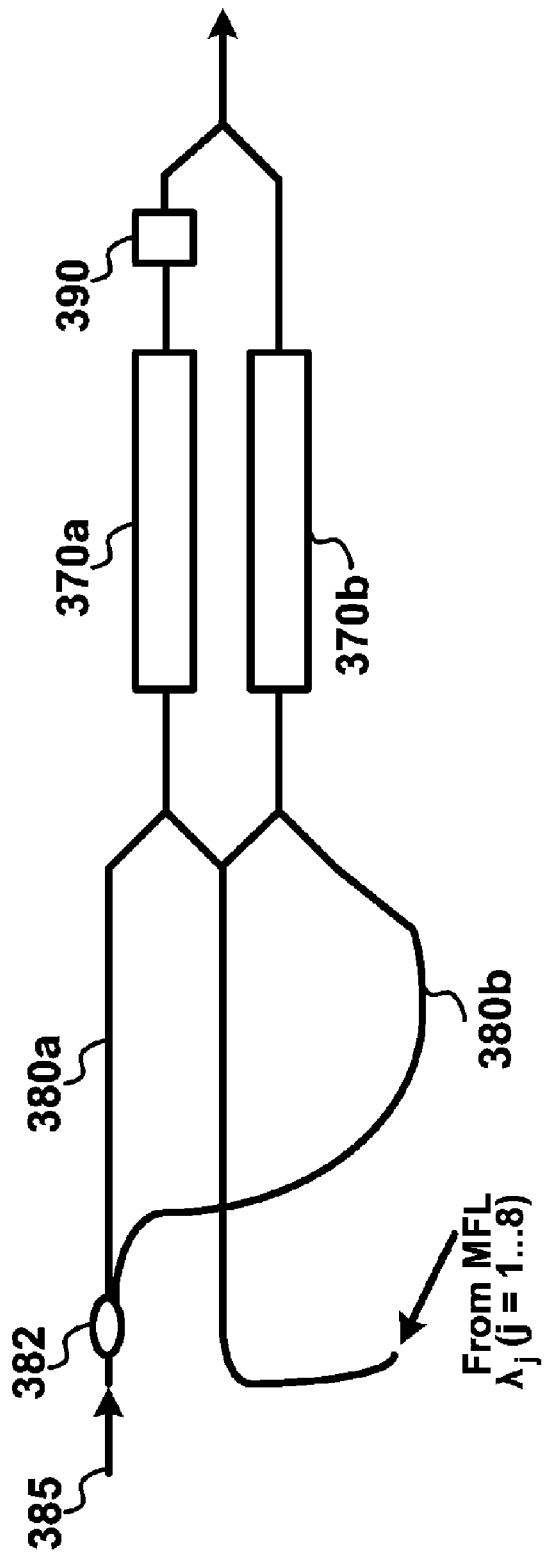
FIG. 3b is a schematic block diagram of a wavelength converter employing a Mach Zehnder interferometer according to the present invention.

With reference now to FIG. 3b where it is shown that the wavelength converting arrangement can also built based upon a Mach-Zehnder Interferometer (MZI) with one nonlinear SOA element 370 in each arm. The signal 385 is first split by the power splitter 382 into two parts. Each part is then launched into one SOA after traveling unequal paths 380. Similarly to the previous case, this arrangement can be seen as an optical gate. If the MZI containing the SOAs 370 is set to permit $\lambda_j$ interfere destructively at the output when no $\lambda_{sig}$ is present (closed gate), a modulated $\lambda_{sig}$ will disturb the balanced MZI thereby "opening the gate" for a period substantially equal to the time delay introduced different optical paths 380a 380b. A phase shifter 390 may be necessary to fine tune the MZI into the desired initial condition of destructive or constructive interference.

It is important to note that the laser source is not optically isolated from the rest of the optical components present on the chip. No optical isolator is needed to protect the laser from optical feedback into the laser cavity since the MFL geometry offers an enhanced robustness against feedback-induced laser instabilities.

Advantageously, our chips such as 310 may be fabricated using well characterized techniques employing a passive-active integration scheme with InP-based semiconductor that allows for monolithic integration of low-loss passive optical waveguides (typically ~0.5-1.0 dB/cm) and SOAs. As is known by those skilled in the art, a base waver may be grown by low pressure MOCVD and preferably include a stack of graded InGaAsP slab layers ($\lambda_g$=1 µm to 1.3 µm) a 100 nm-thick rib layer ($\lambda_g$=1.3 µm), and an active layer with six tensile strained InGaAsP quantum-well layers separated by compressive strained ($\lambda_g$=1.3 µm) barrier layers. Finally, access waveguides are angled by substantially 7 degrees to suppress reflections while the laser cavity 340 is formed by cleaved facets producing the highly reflective surfaces 342, 344. Consequently no Anti-Reflective coating is necessary.

At this point, while we have discussed and described our invention using some specific examples, those skilled in the art will recognize that my teachings are not so limited. More specifically, additional active materials such as GaAs should be satisfactory for fabrication. Additionally, a greater or lesser number of specific frequencies may be provided with our inventive MFL chip, as well as variations in the number and frequencies of specific fixed wavelength converters employed within our inventive delay structures. Accordingly, our invention should be only limited by the scope of the claims attached hereto.

What is claimed is:

1. An optical delay apparatus comprising:
   a means for selectively directing an optical signal into a delay loop;
   a means for successively converting the wavelength of the optical signal traversing the delay loop;
   a means for selectively directing the optical signal traversing the delay loop out of the loop, when the optical signal exhibits a particular wavelength; and
   a means for selectively redirecting the optical signal directed out of the loop, back into the loop;
   wherein said optical delay apparatus is integrated on a single active substrate.

2. The optical delay apparatus of claim 1 further comprising:
   a means for optically demultiplexing the optical signal traversing the delay loop.

3. The optical delay apparatus of claim 2 further comprising:
   a means for optically multiplexing the demultiplexed optical signal traversing the delay loop.

4. The optical delay apparatus of claim 3 wherein said selective directing means is a tunable wavelength converter.

5. The optical delay apparatus of claim 4 further comprising:
   a means for converting the wavelength of the optical signal traversing the delay loop by a predetermined amount each successive time the optical signal traverses the loop.

6. The optical delay apparatus of claim 5 wherein said selective directing means is a tunable wavelength converter.

7. The optical delay apparatus of claim 6 wherein said means for selectively directing the optical signal traversing the delay loop comprises a tunable wavelength converter.

8. The optical delay apparatus of claim 7 wherein said successive converting means comprises a plurality of fixed wavelength converters.

9. The optical delay apparatus of claim 8 wherein said optical multiplexer comprises a frequency routing device.

10. The optical delay apparatus of claim 9 wherein said successive converting means comprises a plurality of fixed wavelength converters.

* * * * *